United States Patent Office 3,070,490
Patented Dec. 25, 1962

3,070,490
PHOSPHONATE NEMATOCIDE
George A. Saul, Nitro, W. Va., and Joseph W. Baker, Kirkwood, Mo., assignors to Monsanto Chemical Company, St. Louis, Mo., a corporation of Delaware
No Drawing. Filed Apr. 20, 1960, Ser. No. 23,379
8 Claims. (Cl. 167—22)

This invention relates to compositions useful in the treatment of soil, particularly to compositions useful in destroying parasitic worms present in the soil, and to a method of applying same. It further relates to the destruction of the parasitic worms known as nematodes in any of the egg, larvae and adult stages of their life cycles and particularly those harmful worms which attack crop plants and cause considerable damage thereto.

The problem of controlling harmful and unwanted parasites present in the soil, such as nematodes, is one of considerable complexity. In order to be an effective toxicant, a compound must be able to penetrate the normally impervious outer covering of the worm as well as the enclosing membranes of the larvae and eggs and to interfere with some vital function of the organism. While the exact mechanism of destroying the soil worm life is not fully understood, it is believed that the effective toxicants destroy or reduce to a low level the effectiveness of vital enzymes. A compound which is effective must be one that will remain in the soil in contact with the undesirable worm life for a sufficient period of time to effect the penetration of the worm and to destroy it by one means or another. To accomplish this result, it is necessary that the toxicant resist the destructive action of soil bacteria, be capable of wetting or penetrating the parasite, possess a substantial water dispersibility, be capable of ready mixture with the soil and possess a sufficiently low vapor pressure so that it does not evaporate before its destructive action is accomplished. Since the exacting requirements of any practical agent cannot be recognized by methods other than by test, it is necessary to observe the effectiveness of chosen compounds against the life cycle of the parasite.

In accordance with the present invention it has been discovered that 1-oxo-2-haloethyl phosphonates are highly effective for controlling soil infesting organisms and particularly nematodes. The phosphonates found to be especially effective for the intended purpose can be represented by the structure

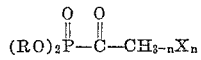

wherein R is an alkyl radical or a chloroalkyl radical containing not more than 3 carbon atoms, wherein $n$ is a whole number from 1 to 3, inclusive, and wherein X is a halogen having an atomic number not higher than 35 (i.e. chlorine, bromine or fluorine but preferably chlorine).

These phosphonates can be prepared by reacting a phosphite of the structure $(RO)_3P$ wherein R has the aforedescribed significance with a substantially equimolar amount of an acid chloride of the structure

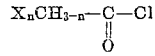

wherein X and $n$ have the aforedescribed significance whereby RCl is formed and recovering the 1-oxo-2-haloethyl phosphonate. The process is described in greater detail in co-pending application Ser. No. 510,553, filed May 23, 1955, now U.S. 2,956,919, of which this application is a continuation-in-part.

As specific embodiments of the invention, nematocidal activity was demonstrated by preparing a suspension of the nematode *Panagrellus redivivus* in water and observing through a microscope the motility of the organisms in the presence of 0.1% of the test material. The nematode in aqueous suspension will flex its body at regular rate and as the nematocide takes effect, the rate of flexing decreases. In the following table, employing the phosphonates of this invention as well as certain other phosphonates, the loss of motility of the nematode is recorded.

| Phosphonate Added $(RO)_2\overset{O}{\overset{\|}{P}}-\overset{O}{\overset{\|}{C}}-A$ | | Percent Motility after 24 hours |
|---|---|---|
| R | A | |
| $CH_3CH_2$ | $CH_2Cl$ | 0 |
| $CH_3CH_2$ | $CCl_3$ | 1 |
| $ClCH_2CH_2$ | $CCl_3$ | 0 |
| $ClCH_2CH_2$ | $CH_2Cl$ | 1 |
| *$CH_3CH_2$ | $CH_3$ | 75 |
| **$CH_3CH_2$ | $CH_2CH_2Cl$ | 50 |
| None | | 100 |

*Prepared by reacting equimolar proportions of acetyl chloride and triethylphosphite to evolve ethyl chloride and recovering diethyl acetylphosphonate (or diethyl 1-oxo-ethyl-phosphonate).
**Prepared by reacting equimolar proportions of 3-chloro-propionyl choride and triethylphosphite to evolve ethyl chloride and recovering diethyl 3-chloropropionylphosphonate (or diethyl 1-oxo-3-chloropropyl-phosphonate).

Other active phosphonates of this invention include:

Dimethyl trichloroacetylphosphonate
Diisopropyl trichloroacetylphosphonate
Dimethyl dibromoacetylphosphonate
Diethyl trifluoroacetylphosphonate
Diethyl dichloroacetylphosphonate
Di(chloromethyl) dichloroacetylphosphonate
Dimethyl dichloroacetylphosphonate In actual usage any of the compounds within the preferred class described may be added to the soil in solution, as an emulsion or water dispersion but preferably is added in a solid formulation wherein the active nematocide is distributed over some dry and permanently free-flowing powder such as the clays, including bentonite and attapulgite or such materials as talc, diatomaceous earth, fuller's earth, chalk, calcium carbonate and the like. These diluents possess the added advantage of lower cost treatment since normally they comprise more than 50% up to 98% of the complete formulation and thereby provide a means of more even distribution of the active material over a wider area and in the effective quantities required. These nematocidal compositions will of course attack the soil phase of the life cycle of nematode parasites which infest animals. Treating barnyards, chicken pens, stable and other infested areas destroys eggs and infestive larvae of many parasites which infest animals. Moreover, the compositions are effective for the control of nematodes in their environment which includes bodies of animals. They are toxic to other worms such as flukes and tapeworms.

In the use of phosphonates of this invention as nematocides or soil fumigants the active compound, diluted or undiluted, may be applied to the soil at rates of 10 to 500 pounds per acre. The preferred application for treating soils of average nematode infestation will be from 25 to 100 pounds per acre. The formulation may contain dispersants which aid uniform distribution.

While this invention has been described with respect to certain embodiments, it is to be understood that it is not so limited and that variations and modifications thereof obvious to those skilled in the art can be made without departing from the spirit and scope thereof.

What is claimed is:

1. The method of destroying the soil phase of nematode parasites which comprises incorporating in the nematode infested soil a nematocidally toxic amount of a 1-oxo-2-haloethyl phosphonate of the structure $$(RO)_2-\overset{O}{\overset{\|}{P}}-\overset{O}{\overset{\|}{C}}-CH_{3-n}X_n$$

wherein R is selected from the group consisting of alkyl radicals and monochloroalkyl radicals containing not more than 3 carbon atoms, wherein $n$ is a whole number from 1 to 3, inclusive, and wherein X is a halogen having an atomic number not higher than 35.

2. The method of claim 1 wherein the phosphonate toxicant is $$(C_2H_5O)_2-\overset{O}{\overset{\|}{P}}-\overset{O}{\overset{\|}{C}}-CH_{3-n}Cl_n$$

wherein $n$ is a whole number from 1 to 3, inclusive.

3. The method of claim 1 wherein the phosphonate toxicant is $$(ClCH_2CH_2O)_2-\overset{O}{\overset{\|}{P}}-\overset{O}{\overset{\|}{P}}-CH_{3-n}Cl_n$$

wherein $n$ is a whole number from 1 to 3, inclusive.

4. The method of claim 1 wherein the phosphonate toxicant is diethyl chloroacetylphosphonate.

5. The method of claim 1 wherein the phosphonate toxicant is diethyl trichloroacetylphosphonate.

6. The method of claim 1 wherein the phosphonate toxicant is di(2-chloroethyl) chloroacetylphosphonate.

7. The method of claim 1 wherein the phosphonate toxicant is di(2-chloroethyl) trichloroacetylphosphonate.

8. The method of destroying the soil phase of nematode parasites in an infested agricultural soil which comprises incorporating in the soil a 1-oxo-2-haloethyl phosphonate of the structure $$(RO)_2-\overset{O}{\overset{\|}{P}}-\overset{O}{\overset{\|}{C}}-CH_{3-n}X_n$$

wherein R is selected from the group consisting of alkyl radicals and monochloroalkyl radicals containing not more than 3 carbon atoms, wherein $n$ is a whole number from 1 to 3, inclusive, and wherein X is a halogen having an atomic number not higher than 35, at the rate of 10 to 500 pounds per acre.

References Cited in the file of this patent

UNITED STATES PATENTS

| | | |
|---|---|---|
| 2,419,073 | Hammer | Apr. 15, 1947 |
| 2,448,265 | Kagy | Aug. 31, 1948 |
| 2,473,984 | Bickerton | June 21, 1949 |
| 2,502,244 | Carter | Mar. 28, 1950 |
| 2,543,580 | Kay | Feb. 27, 1951 |
| 2,779,680 | Wolf | Jan. 29, 1957 |
| 2,956,919 | Baker | Oct. 18, 1960 |